(12) United States Patent
James et al.

(10) Patent No.: US 6,450,260 B1
(45) Date of Patent: Sep. 17, 2002

(54) SAND CONSOLIDATION WITH FLEXIBLE GEL SYSTEM

(75) Inventors: Simon G. James, Stafford; Erik B. Nelson, Houston, both of TX (US); Frédéric J. Guinot, Pau (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 146 days.

(21) Appl. No.: 09/612,208

(22) Filed: Jul. 7, 2000

(51) Int. Cl.$^7$ .................. E21B 33/138; E21B 43/04; E21B 43/26
(52) U.S. Cl. .................. 166/277; 166/281; 166/295; 166/300; 507/224; 507/225; 507/903; 523/130; 523/131
(58) Field of Search ................ 166/276, 277, 166/281, 295, 297, 300; 507/224, 225, 903; 523/130, 131

(56) References Cited

U.S. PATENT DOCUMENTS

| | | | | |
|---|---|---|---|---|
| 2,198,120 A | * | 4/1940 | Lerch et al. | 166/292 |
| 3,306,870 A | * | 2/1967 | Eilers et al. | 166/295 X |
| 3,371,712 A | * | 3/1968 | Adams | 166/295 |
| 3,482,629 A | * | 12/1969 | Suman, Jr. | 166/277 X |
| 3,502,149 A | * | 3/1970 | Pence, Jr. | 166/295 |
| 3,611,733 A | * | 10/1971 | Eilers et al. | 166/294 X |
| 3,635,835 A | * | 1/1972 | Peterson | 507/225 X |
| 3,857,443 A | | 12/1974 | Cole | 166/295 |
| 4,070,865 A | | 1/1978 | McLaughlin | |
| 4,291,766 A | | 9/1981 | Davies et al. | 166/276 |
| 4,427,069 A | | 1/1984 | Friedman | 166/295 |
| 4,649,999 A | | 3/1987 | Sandy et al. | 166/295 |
| 4,669,543 A | | 6/1987 | Young | 166/276 |
| 4,683,949 A | | 8/1987 | Sydansk et al. | 166/270 |
| 4,721,161 A | * | 1/1988 | Richardson et al. | 166/295 |
| 4,893,676 A | * | 1/1990 | Hill | 166/280 |
| 5,199,492 A | | 4/1993 | Surles et al. | 166/295 |
| 5,246,073 A | | 9/1993 | Sandiford et al. | 166/295 |
| 5,335,733 A | | 8/1994 | Sandiford et al. | 166/300 |
| 5,486,312 A | | 1/1996 | Sandiford et al. | 252/315.1 |
| 5,617,920 A | | 4/1997 | Dovan et al. | 166/295 |
| 5,712,314 A | | 1/1998 | Surles et al. | 521/41 |
| 5,806,593 A | | 9/1998 | Surles | 166/270 |
| 5,945,387 A | * | 8/1999 | Chatterji et al. | 507/224 |
| 5,947,644 A | | 9/1999 | Gibbons et al. | 405/267 |
| 5,968,879 A | * | 10/1999 | Onan et al. | 166/300 X |
| 5,981,447 A | | 11/1999 | Chang et al. | 507/271 |
| 5,996,694 A | | 12/1999 | Dewprashad et al. | 166/294 |
| 6,011,075 A | | 1/2000 | Parris et al. | 521/64 |
| 6,047,773 A | | 4/2000 | Zeltmann et al. | 166/281 |
| 6,152,234 A | | 11/2000 | Newhouse et al. | 166/403 |
| 6,330,917 B2 | * | 12/2001 | Chatterji et al. | 166/295 |

OTHER PUBLICATIONS

*Reservoir Stimulation*, 3$^{rd}$ edition, M. Economides and K. Nolte, eds., Section 19.3.

Venkitaraman et al., "Perforating Requirements for Sand Prevention", SPE 58788 (Feb. 2000).

Eoff et al., "High Density Monomer System for Formation Consolidation/Water Shutoff Applications," SPE 50760 (1999).

* cited by examiner

*Primary Examiner*—George Suchfield
(74) *Attorney, Agent, or Firm*—Robin C. Nava; Catherine Menes; Brigitte Jeffery

(57) ABSTRACT

Herein is described a method of consolidating a subterranean formation or repairing a gravel pack, comprising (i) providing a consolidating fluid, wherein the consolidating fluid comprises a gel component and a gel-forming agent; and (ii) injecting the consolidating fluid into the formation or gravel pack, under conditions wherein the gel component forms a flexible gel, thereby consolidating the formation.

17 Claims, No Drawings

SAND CONSOLIDATION WITH FLEXIBLE GEL SYSTEM

TECHNICAL FIELD OF THE INVENTION

This invention relates to the consolidation of hydrocarbon-bearing rock formations to minimize flow of particulates into a wellbore. The consolidation is performed by the injection of a flexible gel system into the formation.

BACKGROUND OF THE INVENTION

Hydrocarbons (oil, natural gas, etc.) are obtained from a subterranean geologic formation (i.e., a "reservoir") by drilling a well that penetrates the hydrocarbon-bearing formation. This provides a partial flowpath for the hydrocarbon to reach the surface. In order for the hydrocarbon to be "produced," that is travel from the formation to the wellbore (and ultimately to the surface), there must be a sufficiently unimpeded flowpath from the formation to the wellbore. This flowpath is through the formation rock-e.g., sandstone, carbonates—which has pores of sufficient size, connectivity, and number to provide a conduit for the hydrocarbon to move through the formation.

When hydrocarbon is produced from a well, formation particulates may travel with the hydrocarbon from the formation, through the wellbore, to the surface. The presence of formation particulates is especially likely in soft formations comprising sand, sandstone, chalk, or limestone. The travel of particulates with the hydrocarbon is undesirable. Particulates flowing through the wellbore will erode equipment in the wellbore and at the surface, which can make replacement of such equipment necessary. Particulates in the produced hydrocarbon must also be removed before the hydrocarbon can be processed. Also, particulates can come to reside in the wellbore to the point where hydrocarbon production is greatly diminished or completely stopped.

One approach to minimize flow of formation particulates into the wellbore is by the use of a gravel pack. Typically, a screen is placed around the wellbore casing. Gravel is then packed between the screen and the casing. Gravel packs can also be used open-hole (i.e. in wellbores without a casing), or screens can be used without gravel packs. Placing gravel above the fracture pressure of the formation may be termed a "frac-pack." As hydrocarbons are produced from the formation, they travel through the gravel pack and/or the screen before entering the wellbore. The gravel pack and/or screen inhibit the flow of particulates but, under normal conditions, do not substantially inhibit the production of hydrocarbons. However, placing a gravel pack and screen requires specialized equipment, and the gravel pack and screen create a mechanical restriction which may be plugged by scale or may be eroded by the flow of particulates. It is desirable to have a method for completing wells in unconsolidated formations that does not involve the use of a gravel pack, a screen, or both.

Another approach involves consolidating the formation by injecting a consolidating fluid comprising, for example, a resin. Conventional consolidating fluids, such as the SANDLOCK™ system (Schlumberger), comprise a resin, and optionally a curing agent, a catalyst, and an oil wetting agent. When injected into the formation, the resin (acted upon by the curing agent and catalyst, if present) hardens, causing consolidation of the formation to a rigid state and reduction in the concentration of formation particulates. These systems are designed to maintain sufficient permeability of the formation to allow production. Consolidating fluids and methods for their use are reported in U.S. Pat. Nos. 5,806,593; 5,199,492; 4,669,543; 4,427,069; and 4,291,766. U.S. Pat. No. 5,712,314 discusses the use of a flexible furan resin system for water control.

However, conventional consolidating fluids have a number of disadvantages. One is inherent to a subterranean formation consolidated by the setting of a resin: because the consolidated formation is under a great deal of stress from surrounding formations, the resin preferably imparts a very high strength to the formation. This increased strength can be assayed in the laboratory by measuring the unconfined compressive strength (UCS) of a formation sample treated with the consolidating fluid. If the strength imparted to the consolidated formation is not sufficiently high, the consolidated formation, being rigid, can fail; failure will then result in the production of sand, which is an undesirable result.

Other disadvantages of conventional consolidating fluids become apparent when a large amount of the fluid is injected into a formation to provide a sufficiently high strength. Maximizing strength requires complex treatment schedules. Increasing the concentration of resin is generally undesirable, because resins tend to be expensive and pose environmental concerns.

Therefore, it is desirable to have a consolidating fluid that, upon use to consolidate a formation, imparts a low probability of failure to the formation. Further, it is desirable for the consolidating fluid to be injected following a simple, preferably a one-step, treatment schedule. It is also desirable for the consolidating fluid to comprise agents that are relatively inexpensive and environmentally acceptable.

U.S. Pat. Nos. 5,246,073; 5,335,733; 5,486,312; and 5,617,920, assigned to Unocal, describe a fluid comprising a polyvinyl polymer, a polymethacrylamide, a cellulose ether, a polysaccharide, a lignosulfonate, an ammonium salt or alkali metal salt of the foregoing, or an alkaline earth salt of a lignosulfonate; and a crosslinking agent, such as an aldehyde, a dialdehyde, a phenol, a substituted phenol, an ether, a polyvalent metal, a chelated polyvalent metal, or a compound capable of yielding a polyvalent metal. One version of such a fluid is commercially available under the trade name "OrganoSEAL-R." These references teach the fluid can be used to seal a wellbore to prevent contamination by water from a water-containing formation penetrated by the wellbore.

U.S. Pat. Nos. 4,683,949 and 5,947,644, assigned to Marathon Oil Co., describe a fluid comprising polyacrylamide and a chromium III/carboxylate complex crosslinking agent. The fluid is commercially available under the trade name "MARASEAL." These references also teach the fluid can be used to seal a wellbore to prevent contamination by water from a water-containing formation penetrated by the wellbore.

Zeltmann et al., U.S. Pat. No. 6,047,773, assigned to Halliburton Energy Services, Inc., reports the use of viscous fluids, such as fluids comprising hydroxyethylcellulose, guar, or acrylic, to occupy a wellbore and provide a barrier to entry of stimulation fluids into a formation. The viscous barrier fluid itself is taught to not penetrate the formation.

U.S. Pat. No. 6,011,075 discloses a method for increasing the storage modulus G' of a flexible gel while maintaining flexibility.

SUMMARY OF THE INVENTION

In one embodiment, the present invention relates to a method of consolidating a subterranean formation, comprising (i) providing a consolidating fluid, wherein the consolidating fluid comprises a gel component and a gel-forming agent; and (ii) injecting the consolidating fluid into the formation, under conditions wherein the consolidating fluid forms a flexible gel, thereby consolidating the formation.

In one further embodiment, the method further comprises injecting a fracturing fluid into the consolidated formation, to form a fractured formation. In a different further embodiment, the method further comprises perforating the consolidated formation, to form a perforated formation. The fractured or perforated formation can then produce hydrocarbons.

In another embodiment, the present invention relates to a method of repairing a plugged gravel pack or frac-pack. The method comprises (i) providing a consolidating fluid as described above and (ii) injecting the consolidating fluid into the gravel, under conditions wherein the consolidating fluid forms a flexible gel, thereby consolidating the gravel. Perforation through the screen and consolidated gravel, and into the formation, followed by fracturing can then be performed.

The present invention has the advantages of forming a consolidated formation with a low probability of failure. This low probability of failure arises from the use of a flexible gel as the consolidating agent. Whereas the consolidating fluids known in the art seek to avoid failure of the consolidated formation by increasing the strength of the formation, flexible gels used according to the present invention negligibly increase the strength of the formation. Instead, the flexibility of the gel enables it to impart a low probability of failure to the consolidated formation. Further, a consolidating fluid of the present invention can be injected following a simple treatment schedule. Generally, the gel components that comprise the flexible gel are relatively inexpensive and environmentally acceptable.

DETAILED DESCRIPTION OF PREFERRED EMBODIMENTS

Components of the Consolidation Fluid

While the compositions of the present invention are described herein as comprising certain materials, it should be understood that the composition can optionally comprise two or more chemically different such materials. For example, a composition could comprise a mixture of two or more gel components, crosslinking agents, or other additives, provided that the compounds chosen for the mixture are compatible with the intended use of the composition as a consolidating fluid.

The consolidating fluid is based on an aqueous solution. The solution can comprise buffers, pH control agents, and various other additives added to promote the stability or the functionality of the fluid.

The consolidating fluid useful in the present method comprises a gel component. A "gel component," as the term is used herein, is a compound that, under at least some downhole conditions, can form a flexible gel. If the gel component is a polymer, the flexible gel is formed by cross-linking of the polymer, preferably in a three-dimensional network. If the gel component is a monomer, the flexible gel is formed by polymerization, preferably generating a three-dimensional polymer network.

As used herein, a "flexible gel" is a gel that is essentially non-rigid after consolidating the formation. Non-rigidity of a gel can be determined by any one or more of the following techniques. A non-rigid gel is one that will substantially return to its starting condition after compression with a linear strain of at least about 10%, preferably at least about 25%, and more preferably greater than about 50%. (Minute permanent deformation may be seen at a sufficiently small scale). The unconfined compressive strength (UCS) of loose sand (40–60 U.S. mesh) consolidated with a flexible gel, as measured according to standard protocols, is typically about 2 psi to about 400 psi, preferably about 2 psi to about 50 psi. (It should be noted a flexible gel by itself typically has a UCS less than about 5 psi). The storage modulus G' of a flexible gel, as measured according to standard protocols given in U.S. Pat. No. 6,011,075, is typically about 150 dynes/cm$^2$ to about 500,000 dynes/cm$^2$, preferably from about 1000 dynes/cm$^2$ to about 200,000 dynes/cm$^2$, more preferably from about 10,000 dynes/cm$^2$ to about 150,000 dynes/cm$^2$.

Another feature of the flexible gel is that it significantly reduces the permeability of the formation or gravel pack, by which is meant reducing the permeability by at least about 90%, preferably by at least about 95%, and more preferably by at least about 99%.

Gel components capable of forming a flexible gel include the following exemplary water-soluble polymers, copolymers, or terpolymers: polyvinyl polymers (such as polyvinyl alcohol or polyvinyl acetate), polyacrylamides, acrylamide copolymers and terpolymers, acrylic acid-methacrylamide copolymers, partially hydrolyzed polyacrylamides, polymethacrylamides, partially hydrolyzed polymethacrylamides, cellulose ethers, polysaccharides, heteropolysaccharides, lignosulfonates, polyalkyleneoxides, carboxycelluloses, carboxyalkylhydroxyethyl celluloses, hydroxyethylcellulose, galactomannans, substituted galactomannans, the ammonium salts or alkali metal salts of the foregoing, and alkaline earth salts of lignosulfonates, among others.

Exemplary water-soluble polymerizable monomers that can be used as a gel component include acrylic acid, acrylamide, methacrylic acid, methacrylamide, hydroxyethylacrylate, maleic acid, diallyldimethyl ammonium chloride, methylene bis-acrylamide, urea, vinyl acetic acid, styrene sulfonic acid, salts thereof, or mixtures thereof. Neither list is intended to be exhaustive.

The concentration of a polymeric gel component in the consolidating fluid is from about 1 wt % to about 10 wt % gel component, preferably about 4 wt % to about 8 wt % gel component, more preferably about 5 wt % to about 7 wt % gel component. The concentration of a monomer gel component is from about 2 wt % to about 60 wt %, preferably from about 5 wt % to about 45 wt %, more preferably from about 15 wt % to about 30 wt %.

The consolidating fluid further comprises a gel-forming agent. By "gel-forming agent" is meant a compound or mixture that assists in the formation of a flexible gel from the gel component under at least some downhole conditions. If the gel component is a polymer, the gel-forming agent is preferably a crosslinking agent, i.e. an agent capable of crosslinking polymer molecules to form a three-dimensional network. Exemplary organic crosslinking agents include, but are not limited to, aldehydes, dialdehydes, phenols, substituted phenols, and ethers. Exemplary inorganic crosslinking agents include, but are not limited to, polyvalent metals, chelated polyvalent metals, and compounds capable of yielding polyvalent metals.

If the gel component is provided as a monomer, the gel-forming agent is preferably able to crosslink the monomer or catalyze the polymerization of the monomer to form a three-dimensional network.

The concentration of the gel-forming agent in the consolidating fluid is typically about 0.001 wt % to about 5 wt %, preferably about 0.005 wt % to about 2 wt %, more preferably about 0.01 wt % to about 1 wt %.

Optionally, if the gel component is a monomer and the gel-forming agent is chosen to crosslink the monomer, the consolidating fluid can further comprise a water-soluble initiator to start the crosslinking reaction. Exemplary initiators include oxidizers, such as ammonium persulfate or azo compounds, such as 2,2'-azobis(2-arnidinopropane) dihydrochloride, among others. The concentration of the initiator is from about 0.0001 wt % to about 5 wt %. Optionally, agents to accelerate or delay initiation, such as potassium ferricyanide, can be added as well.

The consolidating fluid preferably does not form a gel until after its injection into the formation. Before that time, it is desirably a flowable solution that can be readily pumped or otherwise handled. In order to prevent gelation until after the consolidating fluid is injected into the formation, the consolidating fluid is preferably formed shortly before injection into the formation. Typically, the gel-forming agent is the last ingredient added to the nascent consolidating fluid during the latter's formation. In addition, alternative approaches to prevent gelation before injection can be used, such as separating the gel component and the gel-forming agent, adding a gelation inhibitor that readily degrades upon exposure to downhole conditions, or using a reaction that is temperature initiated. Whichever approach is used, it is desirable that after injection, gelation is allowed to readily occur, such as by stripping any emulsifying agent against the formation face or degradation of a gelation inhibitor under downhole temperature. If premature gelation was inhibited by preparing the consolidating fluid shortly before use, then gelation will typically readily occur after injection.

The consolidating fluid can further comprise stabilizing agents, surfactants, diverting agents, or other additives.

Stabilizing agents can be added to slow the degradation of the flexible gel after its formation downhole. Typical stabilizing agents include buffering agents, especially agents capable of buffering at pH of about 8.0 or greater (e.g. water-soluble bicarbonate salts, carbonate salts, phosphate salts, or mixtures thereof, among others); and chelating agents (e.g. ethylenediaminetetraacetic acid (EDTA), nitrilotriacetic acid (NTA), or diethylenetriaminepentaacetic acid (DTPA), hydroxyethylethylenediaminetriacetic acid (HEDTA), or hydroxyethyliminodiacetic acid (HEIDA), among others). Buffering agents are typically added to the consolidating fluid to at least about 0.05 wt %, preferably at least about 0.75 wt %. Chelating agents are typically added to the consolidating fluid to at least about 0.75 mole per mole of metal ions expected to be encountered in the downhole environment, preferably at least about 0.9 mole per mole of metal ions.

Surfactants can be added to promote dispersion or emulsification of components of the consolidating fluid, or to provide foaming of the flexible gel upon its formation downhole. Usable surfactants include, but are not limited to, alkyl polyethylene oxide sulfates, alkyl alkylolamine sulfates, modified ether alcohol sulfate sodium salts, or sodium lauryl sulfate, among others. A surfactant is typically added to the consolidating fluid in the range of about 0.01 wt % to about 10 wt %, preferably about 0.1 wt % to about 2 wt %. Typically, surfactant is added to the consolidating fluid shortly before injection.

Diverting agents can be added to improve penetration of the consolidating fluid into lower-permeability areas when treating a zone with heterogeneous permeability. The use of diverting agents in formation treatment applications is well known, such as given in Reservoir Stimulation, $3^{rd}$ edition, M. Economides and K. Nolte, eds., Section 19.3. Diverting agents can be easily applied in single stage treatments, but not in multiple stage treatments.

Injection of the Consolidating Fluid

After the consolidating fluid is prepared, it can be injected into a formation to consolidate at least a portion of the formation. The portion of the formation may be referred to herein as a "treated zone." A formation is "consolidated" if part or all of it has been treated with the consolidating fluid (i.e. part or all of it is the treated zone) and a flexible gel formed thereby. Preferably, a flexible gel has formed in at least a volume comprising a 0.5 ft radius from the wellbore for the fall height of the treated zone.

The portion of the wellbore through which the consolidating fluid is injected into the treated zone can be open-hole (i.e. comprise no casing) or can have previously received a casing. If cased, the casing is desirably perforated prior to injection of the consolidating fluid. Optionally, the wellbore can have previously received a screen. If it has received a screen, the wellbore can also have previously received a gravel pack, with the placing of the gravel pack optionally occurring above the formation fracture pressure (i.e. a frac-pack).

Techniques for injection of consolidating fluids are well known in the art. Typically, a consolidating fluid is injected through the wellbore into the formation at a pressure less than the fracturing pressure of the formation. Formations for which consolidation is desirable include sand, sandstone, chalk, and limestone, among others. Typically, the consolidating fluid will be injected below the formation fracturing pressure. The consolidating fluid is suitable for use in all formation types.

The volume of consolidating fluid to be injected into the formation is a function of the formation pore volume to be treated and the ability of the consolidating fluid to penetrate the formation. The volume of consolidating fluid to be injected can be readily determined by one of ordinary skill in the art. As a guideline, the formation volume to be treated relates to the height of the desired treated zone and the desired depth of penetration. Preferably, the depth of penetration is at least about 0.5 ft radially from the wellbore into the formation. More preferably, the depth of penetration is at least about 1 ft radially into the formation. The ability of the consolidating fluid to penetrate the formation depends on the permeability of the formation and the viscosity of the consolidating fluid. If the consolidating fluid is prepared shortly before injection, or gelation is otherwise inhibited until after injection, the viscosity of the consolidating fluid is typically sufficiently low as to not slow penetration of the consolidating fluid into the formation. In a low-permeability formation, it is preferred to use a monomer-based consolidating fluid, because monomer-based systems generally have lower viscosity than polymer-based systems.

Packers or similar devices can be used to control flow of the consolidating fluid into the formation for which consolidation is desired.

The minimum and maximum injection rates that can be used are a function of the downhole gelation rate; the maximum pressure that will not lead to fracturing of the formation, if relevant; and limitations of equipment. Preferably, the gelation rate is sufficiently slow to allow complete injection of the desired volume into the formation, but is sufficiently rapid to allow a quick gelation after injection and thus minimize the time spent to perform the consolidating method.

After the consolidating fluid penetrates the formation, gelation occurs, whereby the gel component is cross-linked or polymerized, as appropriate given the gel component and the gel-forming agent. In either case, a flexible gel is formed comprising three-dimensional linkages. Though not to be bound by theory, it is believed the formation is consolidated either by the adhesion of sand grains to the microstructure of the flexible gel, or by the trapping of sand grains by the flexible gel that fills pore spaces. The formation consolidated by the flexible gel is pliable and deformable, with low unconfined compressive strength.

The consolidation of the formation with a flexible gel has a number of advantages over consolidation using setting resins as is known in the art. First, because the consolidated formation can withstand large strains, failure of the consolidated formation produces few, if any, sand grains; rather, the formation fails into pieces, and most sand grains present near the fracture formed between pieces are adhered to or contained by the flexible gel matrix.

Second, the consolidated formation is relatively impermeable. Although this entails a fracturing or perforating step to allow hydrocarbon to be produced through the wellbore, it also means that pores in the formation that do not communicate with the fracture or perforation do not produce sand. Also, fracturing or perforating the formation allows a screenless completion, leading to a cost savings by not including a gravel pack and screen and the apparatus required to place the gravel pack. It also typically leads to increased productivity of the wellbore.

Fracturing or Perforating the Consolidated Formation

After the formation has been consolidated according to the present invention, it has been rendered relatively impermeable, e.g. its permeability has been reduced by at least about 90%, more preferably by at least about 95%, most preferably by at least about 99%. In order to produce hydrocarbon from the formation through the wellbore to the surface, communication between the formation and the wellbore is established by fracturing or perforating through the consolidated formation.

Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. In order to maintain the fractures formed in the formation after the release of the fluid pressure, the fracturing fluid can comprise either a proppant, to physically hold the fractures open, or an acid, which can etch the faces of the fracture to provide pores for hydrocarbon production. Preferably, the fracturing fluid comprises a proppant.

Suitable proppants include, but are not limited to, sand, bauxite, glass beads, and ceramic beads. If sand is used, it will typically be from about 8 to about 100 U.S. Standard Mesh in size. Mixtures of suitable proppants can be used. The concentration of proppant in the fracturing fluid can be any concentration known in the art, and will typically be in the range of about 0.5 to about 20 ppa (pounds of proppant added) per gallon of clean fluid. Preferably, the fracturing fluid contains a proppant-retention agent, e.g. a fiber, a curable resin coated on the proppant, platelets, deformable particles, or a sticky proppant coating, to trap proppant particles in the fracture and prevent their production through the wellbore. Fibers or curable-resin-coated proppants are preferred. An exemplary proppant-retention agent is commercially available as PropNET™ (Schlumberger). The proppant-retention agent keeps the proppant in the fracture, and the proppant and proppant-retention agent keep formation particles from being produced.

Proppant-based fracturing fluids typically also comprise a viscosifier, such as a solvatable polysaccharide or a viscoelastic surfactant, to provide sufficient viscosity to transport the proppant. Other viscosifiers known in the art can be used instead of or in addition to the two listed above. Some viscosity is required to generate the required fracture dimension and to transport proppant. The fracture width and length are affected by the viscosity of the fluid.

In pumping the fracturing fluid into the borehole, it is most economical for the fluid to have as low a viscosity as possible, to minimize the energy expenditure of pumping. On the other hand, some viscosity is required to transport proppant. One of ordinary skill in the art will be able to determine, based on the proppant and other variables, what viscosity increase (through the addition of solvatable polysaccharide or viscoelastic surfactant) is desired.

Perforating the consolidated formation can be performed by techniques known in the art. One common way to do this is to lower a perforating gun into the wellbore using a wireline or slickline, to the desired depth, then detonate a shaped charge within the gun. The shaped charge creates a hole through the consolidated formation. This hole is known as a perforation. Perforating guns are comprised of a shaped charge mounted on a base. U.S. Pat. No. 5,816,343 discusses perforating systems. One of ordinary skill in the art can optimize the perforation strategy for sand prevention, following known techniques such as are taught by Society of Petroleum Engineers paper SPE58788.

EXAMPLES

Example 1

Working Times for a Polyacrylamide-Polymer Based Consolidating Fluid

The time to gelling of a polyacrylamide-based consolidating fluid was determined at rent concentrations of polyacrylamide, HCl, acetic acid, para-toluenesulfonic acid (p-TSA), and hexamethylenetetramine (HMTA), and under temperatures ranging from 110° F.–225°F. The results are as follows:

| Temperature (F.°) | polyacrylamide (wt %) | HCl (ppm) | acetic acid (ppm) | p-TSA (ppm) | HMTA (ppm) | Work time (min) |
|---|---|---|---|---|---|---|
| 110 | 5% | 10000 | 0 | 0 | 3000 | 30 |
| 110 | 5% | 6000 | 0 | 0 | 3000 | 50 |
| 110 | 5% | 10000 | 0 | 0 | 2000 | 37 |
| 110 | 5% | 8000 | 0 | 0 | 2000 | 50 |
| 110 | 5% | 6000 | 0 | 0 | 2000 | 65 |
| 130 | 5% | 6000 | 0 | 0 | 2000 | 25 |
| 130 | 5% | 8000 | 0 | 0 | 2000 | 25 |
| 130 | 5% | 6000 | 0 | 0 | 3000 | 20 |
| 130 | 5% | 8000 | 0 | 0 | 3000 | 20 |
| 130 | 5% | 10000 | 0 | 0 | 2000 | 12 |
| 150 | 5% | 3000 | 1000 | 0 | 2000 | 20 |
| 150 | 5% | 0 | 5000 | 0 | 3000 | 262 |
| 150 | 5% | 0 | 10000 | 0 | 4000 | 140 |
| 150 | 5% | 0 | 15000 | 0 | 3000 | 124 |
| 150 | 5% | 4000 | 0 | 0 | 3000 | 24 |
| 150 | 4% | 0 | 0 | 10000 | 2000 | 50 |
| 150 | 5% | 0 | 0 | 10000 | 2000 | 40 |
| 150 | 4% | 0 | 0 | 10000 | 3000 | 76 |
| 175 | 5% | 0 | 5000 | 0 | 3000 | 96 |
| 175 | 5% | 0 | 4000 | 0 | 4000 | 41 |

-continued

| Temperature (F.°) | polyacryl-amide (wt %) | HCl (ppm) | acetic acid (ppm) | p-TSA (ppm) | HMTA (ppm) | Work time (min) |
|---|---|---|---|---|---|---|
| 175 | 5% | 0 | 4000 | 0 | 2000 | 167 |
| 175 | 5% | 0 | 4000 | 0 | 3000 | 95 |
| 175 | 5% | 0 | 10000 | 0 | 3000 | 62 |
| 175 | 5% | 0 | 3000 | 0 | 4000 | 120 |
| 175 | 5% | 0 | 4000 | 0 | 4000 | 116 |
| 175 | 0% | 0 | 3000 | 0 | 4000 | 64 |
| 175 | 0% | 0 | 6000 | 0 | 3000 | 94 |
| 225 | 0% | 0 | 6000 | 0 | 3000 | 25 |
| 200 | 0% | 0 | 6000 | 0 | 3000 | 48 |
| 200 | 0% | 0 | 5000 | 0 | 3000 | 60 |
| 200 | 0% | 0 | 4000 | 0 | 4000 | 68 |
| 204 | 0% | 0 | 4000 | 0 | 3000 | 66 |
| 201 | 0% | 0 | 3000 | 0 | 3000 | 100 |

These results indicate that the various parameters of the consolidating fluid can be selected in order to modify the gelation time in such a way as to readily allow complete injection of a desired volume of consolidating fluid before gelation occurs at a wide range of typical formation temperatures.

Example 2

Use of a Polyacrylamide-based Consolidating Fluid to Consolidate Unconsolidated Sand An unconsolidated sand mixture was made by tumble blending 85 wt % of a 100–270 US mesh sand, 10 wt % of a sand containing 35 wt % of a 200–325 US mesh sand and 65 wt % <325 US mesh sand, and 5% of a kaolinitic clay. The unconsolidated sand was placed in a rubber sleeve with fine mesh at either end and placed in a core holder and confined at 1500 psi confining stress. Equipment used was similar to that shown in "Reservoir Stimulation", $3^{rd}$ edition edited by M. Economides and K. Nolte, FIG. 14.10. The unconsolidated sand sample was approximately 12 inches long and 1.5 inches in diameter.

A gel consolidating fluid, containing 5 wt % polyacrylamide polymer, 0.3 wt % hexamethylenetetramine (HMTA), and 0.95 wt % acetic acid was injected into the unconsolidated sand at rates between 1 mL/min and 10 mL/min. The sample temperature was then increased to 150° F. and the fluid allowed to form a flexible gel. The sample was cooled to room temperature, removed from the cell and cut into pieces approximately 3 inches long. Unconfined compressive strength (UCS) measurements were made on three pieces of the sample using standard procedures. The unconfined compressive strengths of the three pieces were 39 psi, 41 psi and 39 psi. Even though the pieces failed in the UCS test there were no visible signs of failure (cracks, loose sand grains).

Example 3

Use of a Monomer-based Consolidating Fluid to Consolidate Unconsolidated Sand

An unconsolidated sand mixture was made by tumble blending 85 wt % of a 100–270 US mesh sand, 10 wt % of a sand containing 35 wt % of a 200–325 US mesh sand and 65 wt % <325 US mesh sand, and 5% of a kaolinitic clay. The unconsolidated sand was placed in a rubber sleeve with fine mesh at either end and placed in a core holder and confined at 1500 psi confining stress. Equipment used was similar to that shown in "Reservoir Stimulation", $3^{rd}$ edition edited by M. Economides and K. Nolte, FIG. 14.10. The unconsolidated sand sample was approximately 6 inches long and 1.5 inches in diameter.

A monomer consolidating fluid, containing 51.2 wt % dimethyldiallylammonium chloride, 0.49 wt % methylene diacrylamide, 0.12 wt % ammonium persulphate, and 0.04 wt % potassium ferricyanide was injected into the unconsolidated sand at rates between 1 mL/min and 10 mL/min. The sample temperature was then increased to 150° F. and the fluid allowed to form a flexible gel. The sample was cooled to room temperature, removed from the cell and cut into pieces approximately 3 inches long. Unconfined compressive strength (UCS) measurements were made on two pieces of the sample using standard procedures. The unconfined compressive strengths of the two pieces were 20 psi and 15 psi. Even though the pieces failed in the UCS test there were no visible signs of failure (cracks, loose sand grains).

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A method of consolidating a subterranean formation penetrated by a wellbore, comprising:

providing a consolidating fluid, wherein the consolidating fluid comprises a gel component and a gel-forming agent, said gel component selected from a polyvinyl polymer, polyvinyl alcohol, a polyacrylamide, an acrylamide copolymer or terpolymer, an acrylic acid-methacrylamide copolymer, a partially hydrolyzed polyacrylamide, a polymethacrylamide, a partially hydrolyzed polymethacrylamide, a cellulose ether, a polysaccharide, a heteropolysaccharide, a lignosulfonate, a polyalkyleneoxide, a carboxycellulose, a carboxyalkylhydroxyethyl cellulose, a hydroxyethylcellulose, a galactomannan, a substituted galactomannan, an ammonium salt or alkali metal salt of the foregoing, an alkaline earth salt of a lignosulfonate, acrylic acid, methacrylic acid, methacrylamide, hydroxyethylacrylate, maleic acid, diallyldimethyl ammonium chloride, methylene bis-acrylamide, urea, vinyl acetic acid, styrene sulfonic acid, salts thereof, or a mixture thereof; and injecting the consolidating fluid into the formation through the wellbore, under conditions wherein the consolidating fluid forms a flexible gel, thereby consolidating the formation.

2. The method of claim 1, wherein loose sand of 40–60 U.S. mesh consolidated by the flexible gel has an unconfined compressive strength (UCS) between about 2 psi and about 400 psi.

3. The method of claim 2, wherein loose sand consolidated by the flexible gel has a UCS between about 2 psi and about 50 psi.

4. The method of claim 1, wherein the flexible gel has a storage modulus (G') between about 150 dynes/cm$^2$ and about 500,000 dynes/cm$^2$.

5. The method of claim 4, wherein the flexible gel has G' between about 1000 dynes/cm$^2$ and about 200,000 dynes/cm$^2$.

6. The method of claim 1, wherein the gel-forming agent is an aldehyde, a dialdehyde, a phenol, a substituted phenol, an ether, a polyvalent metal, a chelated polyvalent metal, or a compound capable of yielding a polyvalent metal.

7. The method of claim 1, wherein the gel component is polyacrylamide.

8. The method of claim 7, wherein the gel-forming agent comprises a chromium III/carboxylate complex.

9. The method of claim 1, wherein the gel component is selected from acrylic acid, acrylamide, methacrylic acid, methacrylamide, hydroxyethylacrylate, maleic acid, diallyldimethyl ammonium chloride, methylene bis-acrylamide, urea, vinyl acetic acid, styrene sulfonic acid, salts thereof, or mixtures thereof.

10. The method of claim 1, further comprising injecting a fracturing fluid into the consolidated formation, to form a fractured formation.

11. The method of claim 10, wherein the fracturing fluid comprises a proppant and a proppant-retention agent.

12. The method of claim 1, further comprising perforating the consolidated formation, to form a perforated formation.

13. A method of repairing a plugged gravel pack in a wellbore, comprising:
  providing a consolidating fluid, wherein the consolidating fluid comprises a gel component and a gel-forming agent;
  injecting the consolidating fluid into the gravel pack through the wellbore, under conditions wherein the consolidating fluid forms a flexible gel, thereby consolidating the gravel pack; and,
  perforating the consolidated gravel pack.

14. A method of fracturing a subterranean formation penetrated by a wellbore comprising:
  consolidating the formation using the method of claim 1; and
  injecting a fracturing fluid into the consolidated formation, thereby fracturing the formation.

15. A method of fracturing a subterranean formation penetrated by a wellbore having perforations comprising:
  repairing a plugged gravel pack in a wellbore using the method of claim 13; and
  injecting a fracturing fluid through perforations in the consolidated gravel pack and into said formation, thereby fracturing the formation.

16. The method of claim 1, wherein the concentration of the gel component in the consolidating fluid is from about 2 wt % to about 10 wt %.

17. The method of claim 1, wherein the concentration of the gel component in the consolidating fluid is about 2 wt % to about 60 wt %.

* * * * *